Dec. 14, 1965 H. C. SCHROEDER ETAL 3,223,941

ADJUSTABLE FREQUENCY BRIDGE CIRCUIT

Filed Nov. 5, 1963

INVENTOR
H. C. SCHROEDER
BY J. P. Kearns
ATTORNEY 3,223,941
Patented Dec. 14, 1965

3,223,941

ADJUSTABLE FREQUENCY BRIDGE CIRCUIT

Henry C. Schroeder, East Brunswick Township, Middlesex County, N.J., assignor to Bell Telephone Laboratories, Incorporated, New York, N.Y., a corporation of New York Filed Nov. 5, 1963, Ser. No. 321,490
12 Claims. (Cl. 330—109)

This invention relates to filter networks and in particular to adjustable frequency-rejection filters.

It is often necessary to be able to reject a particular frequency from a band of frequencies being transmitted for communications or measurement purposes. A problem encountered in overseas radio-telephone circuits, for example, is that of interference in the voice band by harmonics of carrier frequencies generated in modulation and demodulation processes. To remove such interference a filter is needed which has a high insertion loss over a narrow bandwidth and a capability of being tuned to any frequency between 250 and 3000 cycles per second.

One arrangement in the prior art for accomplishing this end is the parallel or twin-T network employing three adjustable resistors and three fixed capacitors. Such a network is adjustable over a wide range but a fixed proportionality among the three adjustable resistors must be maintained constant over the entire range of adjustment. This tracking requirement is a distinct disadvantage.

The Wien bridge is another resistor-capacitor network which is useful as a notch or rejection filter. In the Wien bridge two ratio arms include fixed resistors while the other two include, respectively, a series RC circuit and a shunt RC circuit. The frequency at which the bridge becomes balanced is a function of the values of the resistors in the RC arms, assuming that the capacitors remain fixed. Both resistors require adjustment together and they must be equal at all times. The Wien bridge is an improvement over the twin-T filter in the respect that only two resistive potentiometers require ganging for proper frequency control.

It is the object of this invention to improve upon the Wien bridge as a variable notch filter to the extent of using a single control potentiometer.

It is another object of this invention to eliminate the tracking error problem from RC notch filters.

According to this invention the normally adjustable resistors in the RC arms of the prior art Wien bridge are made fixed, a series RC network with the resistive part adjustable is placed in shunt with the resistor in the series RC ratio arm of the bridge, and an additional fixed resistor is added to form a shunt path around the shunt RC ratio arm.

It is a feature of this invention that only two additional resistors and one capacitor are needed to modify the standard Wien bridge to render it controllable by a single variable element.

Other objects, features and advantages of this invention will be readily appreciated upon consideration of the following detailed description together with the drawing in which.

Figure 1:
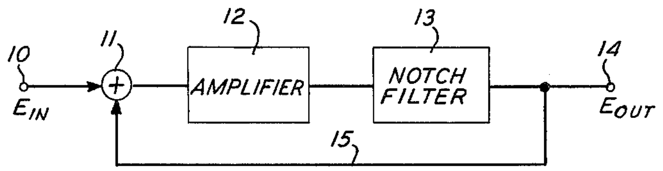
FIG. 1 is a generalized block diagram of an active frequency-rejection filter in which this invention finds utility.

FIG. 1 is a generalized block diagram of an active rejection filter as discussed in detail in chapter 10 of Valley and Wallman's "Vacuum Tube Amplifiers" (McGraw-Hill Book Company, Inc., New York, 1948), specifically on page 396. An alternating-current signal $E_{in}$ is applied to terminal 10 and is amplified in amplifier 12, which has linear gain characteristics and a flat bandpass response over the frequency range of interest and further causes a 180-degree phase shift between input and output. The amplifier output is passed through a notch filter 13, which may not have a sufficiently narrow rejection band operating alone. However, the output of the filter in addition to providing an output voltage $E_{out}$ at terminal 14 is fed back over path 15 to the input to be combined with potential $E_{in}$ at adder 11. This feedback arrangement effectively sharpens the null of the notch filter by a factor equal approximately to the gain of amplifier 12 without feedback. The authors analyze the operation of such a rejection amplifier using a twin-T filter in block 13. The twin-T filter, of course, includes three interdependent adjustable resistors. This invention is directed to an improved notch filter usable in such a rejection amplifier, but having a single adjustable resistor only.

The equation for the overall gain of the rejection amplifier of FIG. 1, assuming a gain without feedback for amplifier 12 as A and the transfer function of notch filter 13 as $\lambda(p)$, is obtained by inspection as follows:

$$\frac{E_{out}}{E_{in}}(p)=\frac{A\cdot\lambda(p)}{1-A\cdot\lambda(p)} \quad (1)$$

Equation 1 indicates in general that the gain of amplifier 12 must either be less than unity or must generate a phase reversal between input and output. In the latter case the rejection amplifier will be stable for all values of gain.

It will be appreciated that the circuit of FIG. 1 will serve as a frequency-selective amplifier if the output is taken between amplifier 12 and notch filter 13. In this case the frequency of the notch will be transmitted and all other frequencies attenuated.

Figure 2:
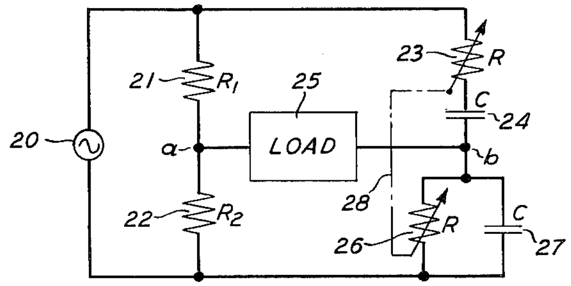
FIG. 2 (PRIOR ART)
FIG. 2 is a circuit diagram of the prior art Wien bridge for comparison purposes.

FIG. 2 gives the circuit diagram of the well known Wien bridge which, once balanced, produces a null at any particular frequency selected by adjustment of the two resistor-capacitor arms.

The Wien bridge comprises four ratio arms each having a resistive element. Two adjacent arms, across which an alternating signal source 20 is connected, include resistors 21 and 22. Also connected across signal source 20 are two resistor-capacitor arms. One such arm includes a resistor 23 in series with a capacitor 24. The other such arm includes an identical resistor 26 and capacitor 27 in parallel with each other. The desired output appears across load 25 connected between junctions designated *a* and *b*. In this analysis the load impedance is considered to be high with respect to the output impedance of the bridge across points *a* and *b*. The two non-capacitive arms, also designated $R_1$ and $R_2$, are initially adjusted for balance at some frequency so that there is a null across load 25. The null occurs at a frequency determined by the setting of resistors 23 and 26, also designated R since they must be equal at all times. Resistors 23 and 26 are interdependent and must be ganged as indicated by dash line 28. Therefore, for effective operation the settings of these resistors must track each other.

The voltage transfer function of the Wien bridge, that is, the ratio between the output voltage across load 25 designated $E_2$ and the input voltage across source 20 designated $E_1$, can be calculated by taking the difference in voltage between junctions *a* and *b*.

The voltage at junction *a* with reference to the lower end of source 20 is seen to be $$E_a=\frac{R_2}{R_1+R_2}E_1 \quad (2)$$

The voltage at junction $b$ also with reference to the lower end of source 20 is by inspection $$E_b=\frac{\frac{R}{SCR+1}}{R+\frac{1}{SC}+\frac{R}{SCR+1}}E_1 \quad (3)$$

where $S=j\omega$ (angular frequency in complex notation).

Subtraction of Equation 2 from Equation 3, division by $E_1$ and rearrangement yields the transfer function $\lambda(s)$ as follows:

$$\lambda(s)=\frac{-R_2}{R_1+R_2}\cdot\frac{S^2C^2R^2-(R_1/R_2-2)SCR+1}{S^2C^2R^2+3SCR+1} \quad (4)$$

It can be shown by setting $\lambda(s)$ to zero that the condition for balance at a particular frequency $\omega_0=1/RC$ occurs when $$R_1=2R_2 \quad (5)$$

The transfer function of Equation 4 then becomes $$\lambda(s)=-\frac{1}{3}\cdot\frac{S^2C^2R^2+1}{S^2C^2R^2+3SCR+1} \quad (6)$$

To simplify further let $p=SCR$. Then $$\lambda(p)=-\frac{1}{3}\cdot\frac{p^2+1}{p^2+3p+1} \quad (7)$$

The last Equation 7 can be substituted in feedback Equation 1 for the circuit of FIG. 1 to show the effect on the operation of the rejection amplifier, whence $$\frac{E_{out}}{E_{in}}(p)=\frac{-A}{3+A}\cdot\frac{p^2+1}{p^2+\frac{9p}{3+A}+1} \quad (8)$$

Equation 8 demonstrates that as long as the gain A of the rejection amplifier exceeds —3 and no phase shift is generated between input and output (because of the negative gain requirement) operation will be stable. In the latter respect the use of the Wien bridge differs from the general rejection filter case discussed above.

Figure 3:
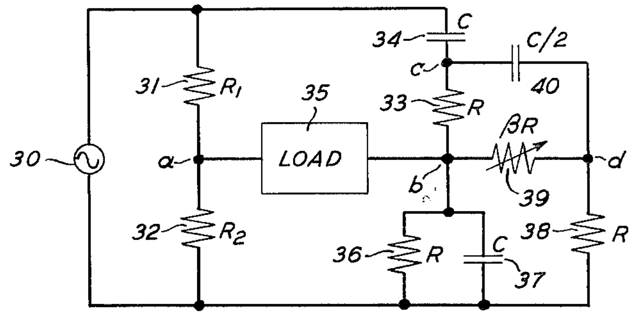
FIG. 3 is a circuit diagram of the improved single variable-element rejection filter of this invention.

The improved single-control bridge according to this invention is shown in FIG. 3. This bridge is basically similar to the Wien bridge of FIG. 2 and corresponding ratio arm elements are designated by the same reference numbers increased by ten. The improvement consists of capacitor 40 and adjustable resistor 39 connected together in series and as a unit in shunt with resistor 33 and also resistor 38 connected between the junction $d$ between resistor 39 and capacitor 40 and the lower junction of resistor 36 and capacitor 37.

The bridge of FIG. 3 can be analyzed in a manner similar to that used with the Wien bridge to obtain its voltage transfer function. The voltage across load 35 is the difference in voltage between points $b$ and $a$. At point $a$ the voltage is the same as that in Equation 2 above for the Wien bridge. The voltage at point $b$ can be calculated from the node equations at points $b$, $c$ and $d$.

For point $b$ the following equation applies:

$$\frac{E_b-E_d}{\beta R}-\frac{E_c-E_b}{R}+\frac{E_b(1+SCR)}{R}=0 \quad (9)$$

Similarly by inspection the equation for point $c$ becomes $$(E_1-E_c)SC-(E_c-E_d)\frac{SC}{2}-\frac{(E_c-E_b)}{R}=0 \quad (10)$$

Finally point $d$ yields the following equation:

$$\frac{E_d}{R}-(E_c-E_d)\frac{SC}{2}-\frac{E_b-E_d}{\beta R}=0 \quad (11)$$

Equations 9, 10 and 11 can be rearranged according to their voltage coefficients and solved by matrix methods to yield $$E_b(s)=\frac{\beta+1}{\beta}\cdot\frac{SCRE_1}{S^2C^2R^2+4SCR(1+1/\beta)+1+2\beta} \quad (12)$$

The difference between Equations 12 and 2 divided by $E_1$ is the transfer function of the improved bridge circuit. Therefore $$\lambda(s)=\frac{-R_2}{R_1+R_2}\cdot\frac{S^2C^2R^2+(1+1/\beta)(R_1-3R_2)SCR+(1+2/\beta)}{S^2C^2R^2+4(1+1/\beta)SCR+1+2/\beta} \quad (13)$$

By setting Equation 13 equal to zero, the balance condition is obtained at a frequency $$\omega_0=\frac{(1+2/\beta)^{1/2}}{RC}$$

as $$R_1=3R_2 \quad (14)$$

At balance the transfer function is obtained by substituting Equation 14 into Equation 13 to yield $$\lambda(s)=-\frac{1}{4}\cdot\frac{\frac{S^2C^2R^2}{1+2/\beta}+1}{\frac{S^2C^2R^2}{1+2/\beta}+\frac{4(1+1/\beta)}{1+2/\beta}SCR+1} \quad (15)$$

To simplify let $p=SCR/(1+2/\beta)^{1/2}$. Then the transfer function in $p$ notation is $$\lambda(p)=-\frac{1}{4}\cdot\frac{p^2+1}{p^2+\frac{4(1+1/\beta}{(1+2/\beta)^{1/2}}p+1} \quad (16)$$

The frequency of zero transmission through the improved bridge circuit depends only on the variable $\beta$, which may be set anywhere between zero and infinity.

For example, for $\beta$ equal to infinity the equation for the frequency of zero transmission $$\omega_0=\frac{1}{RC}(1+2/\beta)^{1/2}$$

reduces to $$\omega_0=\frac{1}{RC}$$

Therefore, the minimum frequency for zero transmission is determined by the settings of the fixed resistors 33 and 36, and fixed capacitors 34 and 37. For $\beta$ equal to zero, on the other hand, the equation for frequency becomes infinite. As a practical matter, however, the upper frequency limit is restricted by stray capacitance, component matching and degree of balance.

Equation 16 can be substituted in the feedback Equation 1 to give $$\frac{E_{out}}{E_{in}}(p)=\frac{-A}{4+A}\cdot\frac{p^21+1}{p^2+\frac{16(1+1/\beta)}{(4+A)(1+2/\beta)^{1/2}}p+1} \quad (17)$$

Equation 17 is comparable to Equation 8 for the Wien bridge. The equation indicates circuit stability at a gain exceeding 4 with zero degrees of phase shift between input and output. Thus, a somewhat higher amplifier gain is required with the improved bridge over the circuit using the Wien bridge to obtain comparable bandwidth in the notch.

The fact that the $\beta$ factor occurs also in the $p$ coefficient complicates the analysis of the single-control bridge. The main practical effect of this, however, is that the bandwidth of the notch tends to increase for higher frequencies. This slight disadvantage can be overcome by providing for adjustment of amplifier gain where extremely wide frequency ranges must be accommodated by the bridge. The higher is the gain of the amplifier in general, the narrower is the bandwidth of the notch. In the voice-frequency range contemplated for the particular application to radio-telephony no amplifier adjustment is necessary.

While the improved single-element control bridge circuit has been described in connection with a specific type of frequency-rejection amplifier, it is to be understood by those skilled in the art that it has many additional applications such as to frequency-measuring test equipment and tunable oscillators.

What is claimed is:

1. In a Wien bridge circuit having four ratio arms, the first and second arms of which include pure resistances, the third arm of which includes a resistor and capacitor in series and the fourth arm of which includes a like-valued resistor and capacitor in parallel, the improvement comprising a common junction point outside said bridge circuit, a capacitor of half the value of those in said third and fourth arms interconnecting said common point and the junction of the resistor and capacitor in said third arm, a fixed resistor of the same value as those in said third and fourth arms interconnecting said common point and the junction of the resistor and capacitor in said fourth arm with said second arm, and a variable resistance element interconnecting said common point and the junction of said third and fourth arms, the frequency at which a null balance is obtained between the junction of said first and second arms and the junction of said third and fourth arms being a singular function of the setting of said variable resistance element.

2. The bridge circuit of claim 1 in which the pure resistances in the first and second ratio arms are in the ratio of three-to-one for the null balance condition.

3. The bridge circuit of claim 1 in which a broadband signal source is connected across the ratio arms including said pure resistances.

4. The bridge circuit of claim 1 in which a load circuit across which a null balance is obtained for a preselected frequency is connected between the junction of said pure resistances and the junction of said third and fourth ratio arms.

5. A frequency-selective attenuating network of the bridge type comprising a pair of input terminals, a pair of output terminals, a signal source of multiple frequency content connected across said input terminals, a utilization circuit connected across said output terminals, a first fixed resistor connected between one of said input terminals and one of said output terminals, a second fixed resistor connected between the other of said input terminals and the one of said output terminals, a third fixed resistor and a first fixed capacitor connected in series between said one input terminal and the other of said output terminals, a fourth fixed resistor and a second fixed capacitor connected in shunt between said other output terminal and said other input terminal, a fifth terminal, a third capacitor connected between said fifth terminal and the junction formed between said third resistor and said first capacitor, a fifth fixed resistor connected between said fifth terminal and said other input terminal, and an adjustable resistor connected between said fifth terminal and said other output terminal.

6. The network of claim 5 in which said bridge is balanced to produce a null across said utilization circuit at some frequency when said first fixed resistor is three times the value of said second fixed resistor;

said third, fourth and fifth fired resistors are equal in value to each other;

said first and second fixed capacitors are equal in value to each other; and said third fixed capacitor is equal to half the value of said first and second capacitors.

7. The network of claim 6 in which said bridge is balanced to produce a null across said utilization circuit at a particular preselected frequency by manual adjustment of said adjustable resistor alone.

8. An active frequency-selective filter system including an amplifier having input and output terminals, a notch filter network connected in series with said amplifier between the input and output terminals of said amplifier, said network having output terminals, said notch filter network comprising a bridge circuit having four ratio arms, first and second resistors in two of said arms, a resistor and capacitor in series in a third arm, a resistor and capacitor in parallel in a fourth arm, means connecting the output terminals of said amplifier across the diagonal of said bridge circuit defined by the junctions of said first and third arms and of said second and fourth arms, the output terminals of said network being defined by the junctions of said first and second arms and of said third and fourth arms, a further capacitor and an adjustable resistor connected together in series and as a unit in shunt with the resistor in said third arm, and a further resistor connected between the junction of said further capacitor and adjustable resistor and the junction of said second and fourth arms, the frequency selected by said filter system being a sole function of the setting of said adjustable resistor.

9. The active filter system according to claim 8 in which a broadband signal source is connected to the input terminals of said amplifier and a utilization circuit is connected to the output terminals of said notch filter network to constitute said active filter system a sharply selective band-elimination filter.

10. The active filter system according to claim 8 in which a broadband signal source is connected to the input terminals of said amplifier and a utilization circuit is connected to the output terminals of said amplifier to constitute said active filter system a sharply selective band-pass filter.

11. The active filter system according to claim 8 in which the resistance ratio between said first and second resistors is three to one, the resistors in said third and fourth arms and said further resistor are of equal value, and the capacitors in said third and fourth arms are of equal value to each other and twice the value of said further capacitor, the values chosen for said resistors and capacitors determining the minimum frequency which said filter system can select.

12. In combination, a broadband signal source, a load circuit, a frequency-selective bridge circuit interconnecting by its diagonals said signal source and load circuit, said bridge circuit having a single variable resistive element for frequency selection comprising first and second resistive arms having a resistance ratio of three to one connected across said signal source, third and fourth arms including respectively a resistor and a capacitor in series and a resistor and a capacitor in parallel, said resistors being of equal value to each other and said capacitors being of equal value to each other, said load circuit being connected between the junctions of said first and second arms and said third and fourth arms, a further capacitor having a value equal to half that of said first-mentioned capacitors and a further resistor having a value equal to that of said first-mentioned resistors connected in series between the junction of the resistor and capacitor in series in said third arm and the junction of said second and fourth arms, and means connecting said variable resistive element between the junction of said further resistor and capacitor and the junction of said third and fourth arms.

No references cited.

HERMAN KARL SAALBACH, *Primary Examiner.*